No. 897,664. PATENTED SEPT. 1, 1908.
E. T. ROBINSON.
DISAPPEARING LUGGAGE CARRIER FOR AUTOMOBILES.
APPLICATION FILED FEB. 11, 1908.
2 SHEETS—SHEET 1.
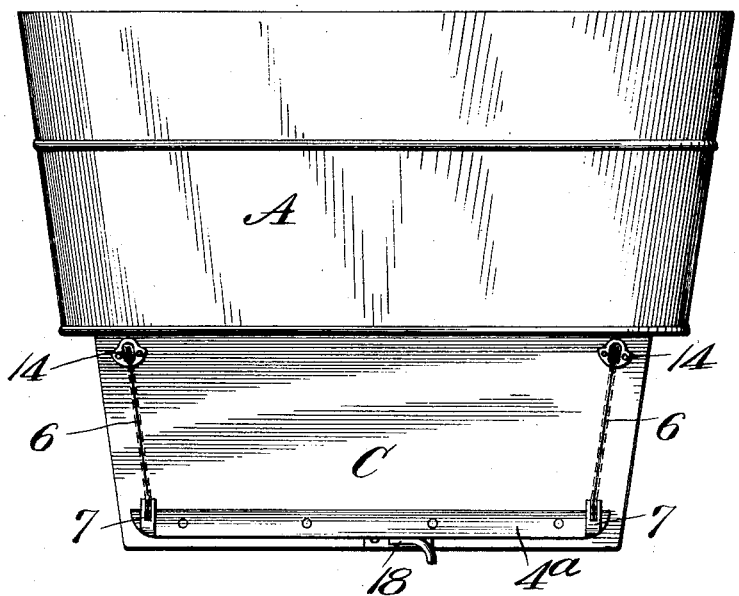
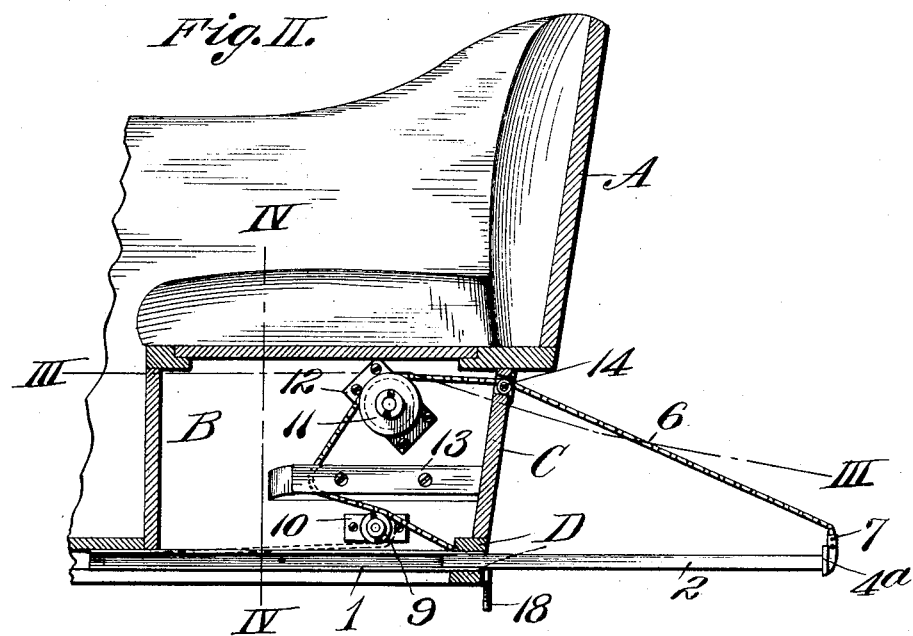

No. 897,664.  
PATENTED SEPT. 1, 1908.  
E. T. ROBINSON.  
DISAPPEARING LUGGAGE CARRIER FOR AUTOMOBILES.  
APPLICATION FILED FEB. 11, 1908.  
2 SHEETS—SHEET 2.
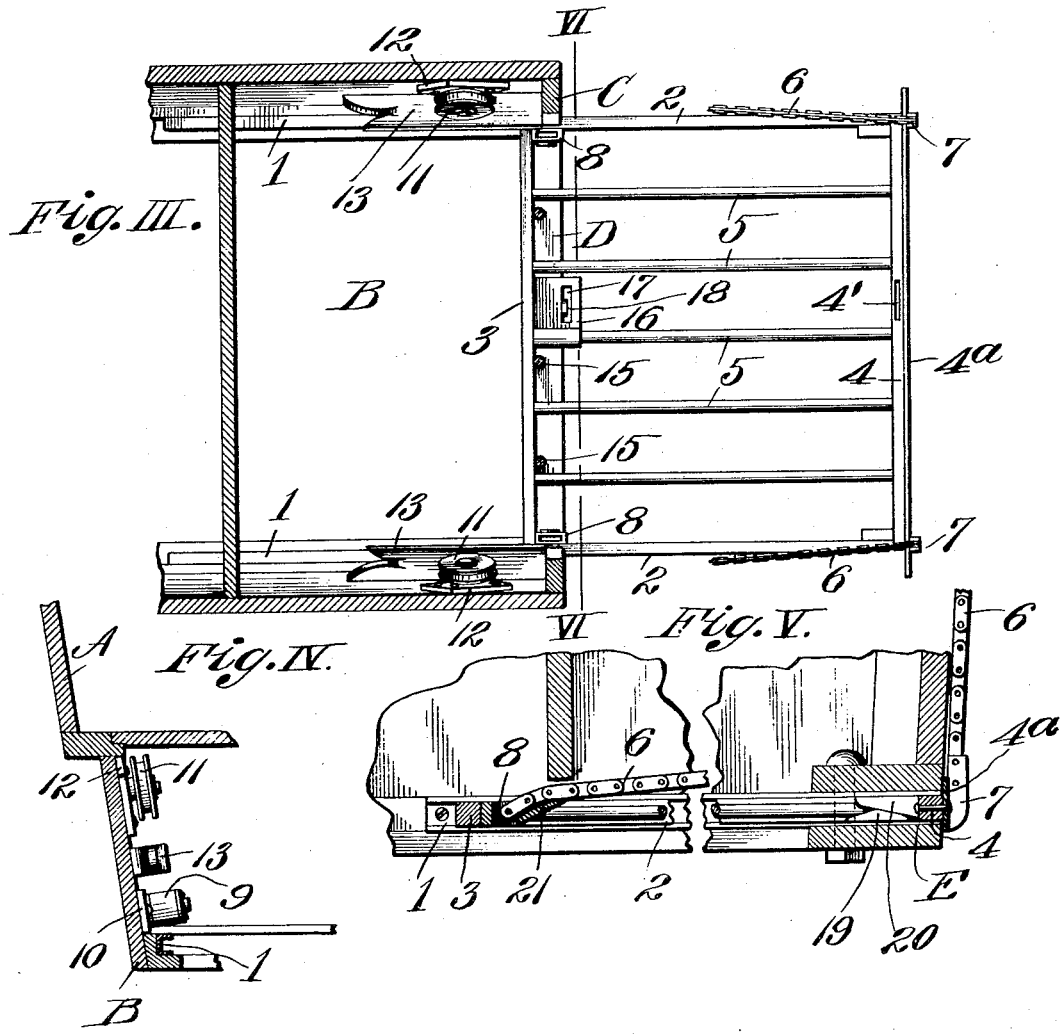
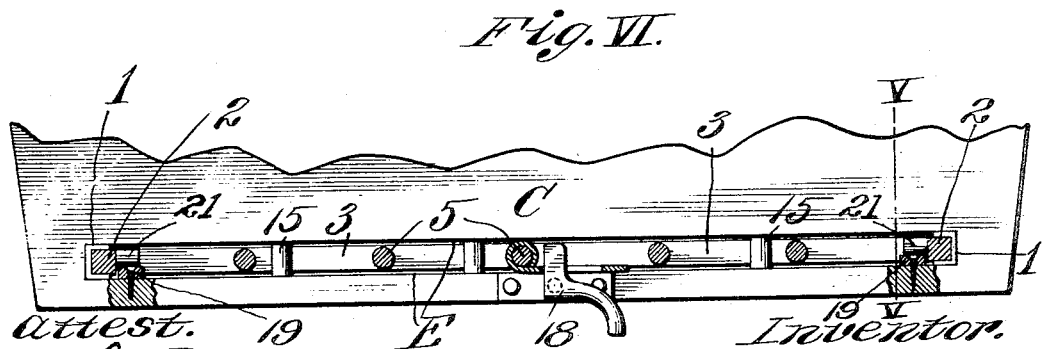

UNITED STATES PATENT OFFICE.

EDWARD T. ROBINSON, OF ST. LOUIS, MISSOURI, ASSIGNOR TO ST. LOUIS CAR COMPANY, OF ST. LOUIS, MISSOURI, A CORPORATION.

DISAPPEARING LUGGAGE-CARRIER FOR AUTOMOBILES.

No. 897,664.  Specification of Letters Patent.  Patented Sept. 1, 1908.

Application filed February 11, 1908. Serial No. 415,357.

*To all whom it may concern:*

Be it known that I, EDWARD T. ROBINSON, a citizen of the United States of America, residing in the city of St. Louis and State of Missouri, have invented certain new and useful Improvements in Disappearing Luggage-Carriers for Automobiles, of which the following is a full, clear, and exact description, reference being had to the accompanying drawings, forming part of this specification.

My invention relates to a luggage carrier for automobiles and it has for its object the production of a carrier of this character which may be confined within the body of an automobile out of view when not in use, but may be readily withdrawn from the body of the vehicle for service.

The invention has for its object the production of a luggage carrier of this description which is of simple construction and the parts of which are held in a steady condition when the carrier is in either its inner or outer position.

Figure I is a rear elevation of the body of an automobile and my luggage carrier mounted in said body. Fig. II is a view showing the body of the automobile in vertical longitudinal section and the luggage carrier in elevation and withdrawn into position for service. Fig. III is in part a horizontal section taken on line III—III, Fig. II, through the body of the automobile and in part a top or plan view of the luggage carrier. Fig. IV is a vertical cross section taken on line IV—IV, Fig. II. Fig. V is an enlarged vertical longitudinal section taken on line V—V, Fig. VI through one corner of the automobile body and the luggage carrier, said carrier being shown in its inner position. Fig. VI is an enlarged vertical cross section taken on line VI—VI, Fig. III.

In the accompanying drawings: A designates the rear portion of the body of an automobile at the bottom of which and beneath the rear seat of the vehicle is a compartment B that is partly inclosed by the sides of the automobile body and the back board C. Beneath the back board C is a cross bar D, see Fig. II, that is provided with a longitudinal slot E and is suitably supported by attachment to the sides of the automobile body.

1 designates guide strips preferably of channel-shape, which are secured to the sides of an automobile body and extend longitudinally of said body at the bottom of the compartment B. These guide strips terminate at their rear ends within the slot E of the cross bar D.

2 designates the side bars of a luggage supporting frame, that are adapted to ride in the guide strips 1, said bars being united at their forward ends by a forward cross bar 3 and at their rear ends by a rear cross bar 4.

5 are connecting rods mounted in the forward and rear cross bars 3 and 4 and which, with the parts 2, 3 and 4, constitute the luggage supporting frame that is adapted to be moved into the compartment B of the automobile to be out of view when not in use and to be withdrawn into the position seen in Figs. II and III, when luggage is to be carried on said frame.

6 designates a pair of chains that serve as supports for the rear or outer end of the luggage supporting frame. One end of each of said chains is connected to the outer end of the luggage supporting frame by attachment to lugs 7 carried by the rear cross bar 4 and are attached at their inner ends to lugs 8 secured to the side bars 2 adjacent to the forward cross bar 3. The chains 6 are adapted to operate upon rollers 9 journaled to brackets 10 located near the bottom of the compartment B and sheaves 11 journaled to brackets 12 located near the top of said compartment and which brackets are both secured to the sides of the automobile body. The chains also pass through resistance blocks 13 that are secured to the sides of the automobile body and are bifurcated at their rear ends to receive the chains. These resistance blocks serve to relieve the sheaves 11 of strain when a weight is imposed upon the frame of the luggage carrier. The chains also operate upon sheaves 14 mounted in the back board C near its upper edge.

When the frame of the luggage carrier is moved into its outer position for service the chains 6 ride upon the rollers and sheaves mentioned and the existence of slack in said chains is obviated by the continual presence of the chains upon said rollers and within the resistance blocks 13, and as a consequence, the chains are in position to serve as supporting members for the outer end of the carrier frame when said frame is withdrawn from the automobile body. When the frame is again moved inwardly, the inner ends of the chains are carried beneath the rollers 9 and the chain is drawn into the compartment B without slack occurring therein with the result that the only portion of each chain that is in view at the exterior of the automobile body is that located between the rear end of the carrier frame and the sheaves 14 in the back board C.

For the purpose of limiting the degree of outward movement of the carrier frame I mount in the cross bar D a series of posts 15 that are adapted to be engaged by the forward cross bar 3 of the carrier frame when the frame is moved outwardly into position for use. To provide for the carrier frame being held from inward movement after it has been withdrawn from the compartment B I attach to said frame, preferably by securing it to one of the cross rods 5, a keeper plate 16 that is provided with a slot 17 and furnish a catch 18 that is pivoted to the cross bar D and is adapted to enter the slot in said keeper, as seen in Fig. III. This catch is also adapted to enter a slot 4' in the rear cross bar of the carrier frame, also seen in Fig. III, for the purpose of holding the carrier frame from outward movement after it has been moved into the compartment B. 4ª is a closure plate that is carried by the outer cross bar of the carrier frame and which serves to close the slot E in the cross bar D when the carrier frame is in its inner position.

For the purpose of preventing rattling of the carrier frame when in either its inner or outer positions, I provide the following parts: 19 are lower anti-rattler blocks situated at the bottom of the slot E in the cross bar D and having beveled upper faces extending rearwardly and forwardly relative to the carrier frame. 20 are depending upper beveled blocks that are secured to the carrier frame at its rear end, see Fig. V, and which are adapted to ride onto the rear beveled faces of the lower anti-rattler blocks when the carrier frame is moved to its inner position, thereby causing said frame to be tightly joined between the anti-rattler blocks and the top of the slot E. 21 are beveled blocks secured to the carrier frame near its forward end and which are adapted to ride onto the anti-rattler blocks 19 when the carrier frame is moved to its outer position, whereby said frame is joined between said anti-rattler blocks and the top of the slot E in a manner similar to that in which it is joined when the frame is in its inner position.

I claim:

1. The combination with a vehicle body, of a luggage frame slidably mounted in said body, so as to be shiftable thereunder, flexible means attached to the forward and rear ends of said frame, and means carried by said body on which said flexible means is operable, substantially as set forth.

2. The combination with a vehicle body, of guide strips beneath said body, a luggage frame slidably fitted to said guide strips, flexible means attached to the forward and rear ends of said frame, and rollers carried by said body on which said flexible means is operable, substantially as set forth.

EDWARD T. ROBINSON.

In presence of—
A. DIEKMANN,
M. C. MURPHY.